United States Patent [19]

Wilson et al.

[11] Patent Number: 5,339,564

[45] Date of Patent: Aug. 23, 1994

[54] METHOD FOR CONTROL AND DESTRUCTION OF AGRICULTURAL PESTS BY COHERENT ELECTROMAGNETIC EXCITATION

[76] Inventors: Steve D. Wilson, P.O. Box 415, Soquel, Calif. 95073; William L. Clarke, 124 De la Costa, Santa Cruz, Calif. 95060

[21] Appl. No.: 153,206

[22] Filed: Nov. 16, 1993

[51] Int. Cl.$^5$ .................. A01M 1/20; A01M 17/00
[52] U.S. Cl. .......................... 43/124; 43/107
[58] Field of Search ............... 43/124, 132.1, 107, 43/112, 121; 119/264

[56] References Cited

U.S. PATENT DOCUMENTS

| | | | |
|---|---|---|---|
| 4,179,839 | 12/1979 | Salotti et al. | 43/112 |
| 4,275,523 | 6/1981 | Baima et al. | 43/112 |
| 4,423,564 | 1/1984 | Davies et al. | 43/121 |
| 4,667,436 | 5/1987 | Benson | 43/112 |

*Primary Examiner*—P. Austin Bradley
*Assistant Examiner*—Chuck Y. Mah
*Attorney, Agent, or Firm*—Jeffrey A. Hall

[57] ABSTRACT

A method for the control and destruction of agricultural pest organisms comprising generating a selected EM radiation at a plurality of different frequencies, pulse widths, and intensities for application on pest organisms, coupling the EM radiation to selected cellular organelles, organelle membranes, or cell membranes of the pest organism, disrupting an ionic balance within the cellular organelles, organelle membranes, or cell membranes, and initiating an increase in cation concentration within the membranes or organelles. The cation concentration is sustained until the pest organism is destroyed. A system and apparatus are also disclosed where an oscillator operably coupled to a broad band linear amplifier generate selected EM radiation frequencies to be applied to pest organisms. The oscillator is preferably a frequency-hopping RF oscillator and is communicatively linked to an antenna coupled to a reflector and shield for focusing the EM radiation.

9 Claims, 2 Drawing Sheets

METHOD OF COUPLING
EM RADIATION WITH
MITOCHONDRIAL MEMBRANE

METHOD OF COUPLING
EM RADIATION WITH
MITOCHONDRIAL MEMBRANE

METHOD FOR CONTROL AND DESTRUCTION OF AGRICULTURAL PESTS BY COHERENT ELECTROMAGNETIC EXCITATION

BACKGROUND OF THE INVENTION

1. Field of Invention

This invention relates to methods and apparatuses for the control and destruction of agricultural pests, and more particularly to methods and apparatuses for controlled and specific application of selected electromagnetic radiation (EM) to cell membranes, organelle membranes, and organelles within the pest organism.

2. Description of Related Art

Long term and heavy use of insecticides, pesticides, and herbicides has resulted in widespread environmental damage throughout the world. Such use has particularly affected significant reservoirs of ground water, surface water, and land areas. There is therefore, a great need for a method and means of safely applying such method, for controlling and destroying agricultural pests such as nematodes, aphids, and the like, which does not pollute the environment, or harm beneficial animals, agricultural crops, or humans.

Heretofore, a wide variety of methods and apparatuses have been proposed and implemented to control harmful agricultural pests. For example, it is well known that microwave radiation can sterilize soil and kill most types of plant an animal life. However, a problem with microwave based systems and methods is that there is a concomitant destruction of beneficial plants, animals, and microorganisms. Such random destruction of beneficial organisms along with the destruction of pest organisms severely limits the applicability and usefulness of such prior methods and apparatuses. For example, the current infestation of Phylloxera in California and Europe is destroying millions of dollars worth of grapevines, however, existing non-specific microwave irradiation techniques cannot be used to kill the Phylloxera, since these techniques also kill the grapevines.

A principal drawback of prior techniques using microwave or other EM radiation appear is the use of non-coherent coupling of such radiation with the cellular structures of the pest organism. That is, in existing applications the microwave energy simply heats the water contained in the pest organisms to very high temperatures, thereby destroying them. Unfortunately, since all agricultural crops and beneficial organisms also contain water, these beneficial crops are also destroyed. Such limitations have undoubtedly been a reason these prior attempts at pest control using EM radiation have not received widespread acceptance.

There is clearly a need for a method and means of applying the same whereby agricultural pests can be controlled without the concomitant damage of other benign or beneficial organisms and without damage to the environment. Clearly, prior attempts to use EM radiation in this manner have been unsatisfactory. In order to overcome the shortcomings of prior art methods and apparatuses it is preferable to apply a frequency of EM radiation whose frequencies are not absorbed strongly by water, yet can kill agricultural pests. Moreover, such a method and must be species specific, controllable, repeatable, and applicable to both small scale mid large scale applications.

Accordingly, it is the primary object of this invention to provide an improved method and apparatus for the selective application of EM radiation to control and destroy harmful agricultural pests while minimizing direct and collateral damage to beneficial crops and other organisms.

Additional objects and advantages of the invention will be set forth in the description which follows, and in part will be obvious from the descriptions, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, a method for the control and destruction of agricultural pest organisms, for specific coupling and destruction of specific cellular organelles, organelle membranes, and cell membranes within the pest organism, is provided, comprising: generating a narrow-band EM radiation at a plurality of different frequencies, pulse widths, and intensities for application on said pest organism; coupling said narrow-band EM radiation to said cellular organelles, organelle membranes, or cell membranes of the pest organism; disrupting an ionic balance within said cellular organelles, organelle membranes, or cell membranes by said narrow-band EM radiation; initiating an increase in cation concentration within the cellular organelles, organelle membranes, or cell membranes; and sustaining said increase in cation concentration for a time sufficient to kill said pest organism.

To generate the narrow-band EM radiation means preferably include oscillator means coupled with antenna means for generating and manipulating the EM radiation at a plurality of different frequencies, pulse widths, and intensities. The narrow-band EM radiation generated preferably couples only weakly to water molecules and does not cause detrimental heat generation within valuable plant cells or cells of other beneficial organism, such as crop plants and associated microorganisms.

In accordance with the present invention there also is provided a system and apparatus for the specific control and destruction of agricultural pest organisms, comprising: means for generating a narrow-band EM radiation at a plurality of different frequencies, pulse widths, and intensities; means for manipulating said narrow-band EM radiation for direction and application at specific cellular sites within said agricultural pest organism; and frequency switching means for altering said frequencies of said narrow-band EM radiation generated so that a large power density is spread over a broad band of bio-specific frequencies resulting in coherent biodisruption of the agricultural pest organism.

A significant aspect of the present invention is the use of specific frequencies and pulse widths of EM energy which coherently couple to and are absorbed by the cellular organelle structures or cellular membrane structures uniquely specific to agricultural pests, and which are only weakly absorbed by the cellular structures of beneficial animal cells and agricultural plant cells. The absorption of the specifically applied and prepared EM energy by the organelles, organelle membranes, or membranes of the cells of the pest organisms, initiates and sustains an induced electro-biochemical process which strongly disrupts the natural enzymatic processes which regulate the ionic balance of the pest cells, leading to lysis, and the destruction of the pest cells, and which the induced processes do not appreciably affect valuable plant cells or cells of other beneficial organisms.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

DETAILED DESCRIPTION OF THE PREFERRED EMBODIMENTS

Reference will now be made in detail to the present preferred embodiments of the invention as illustrated in the accompanying drawings and described in detail herein.

In accordance with the present invention, there is provided a method for the control and destruction of agricultural pest organisms, for specific coupling and destruction of specific cellular organelles, organelle membranes, and cell membranes within the pest organism, comprising; generating a narrow-band EM radiation at a plurality of different frequencies, pulse widths, and intensities for application on said pest organism; coupling said narrow-band EM radiation to said cellular organelles, organelle membranes, or cell membranes of the pest organism; disrupting an ionic balance within said cellular organelles, organelle membranes, and cell membranes by said narrow-band EM radiation; initiating an increase in cation concentration within the cellular organelles, organelle membranes or cell membranes; and sustaining said increase in cation concentration for a time sufficient to kill said pest organism.

In accordance with the purposes of the invention, there is also provided a system and apparatus for the specific control and destruction of agricultural pest organisms, comprising: means for generating a narrow-band EM radiation at a plurality of different frequencies, pulse widths, and intensities; means for manipulating said narrow-band EM radiation for direction and application at specific cellular sites within said agricultural pest organism; and frequency switching means for altering said frequencies of said narrow-band EM radiation generated so that a large power density is spread over a broad band of bio-specific frequencies resulting in coherent biodisruption of the agricultural pest organism.

Figure 1:
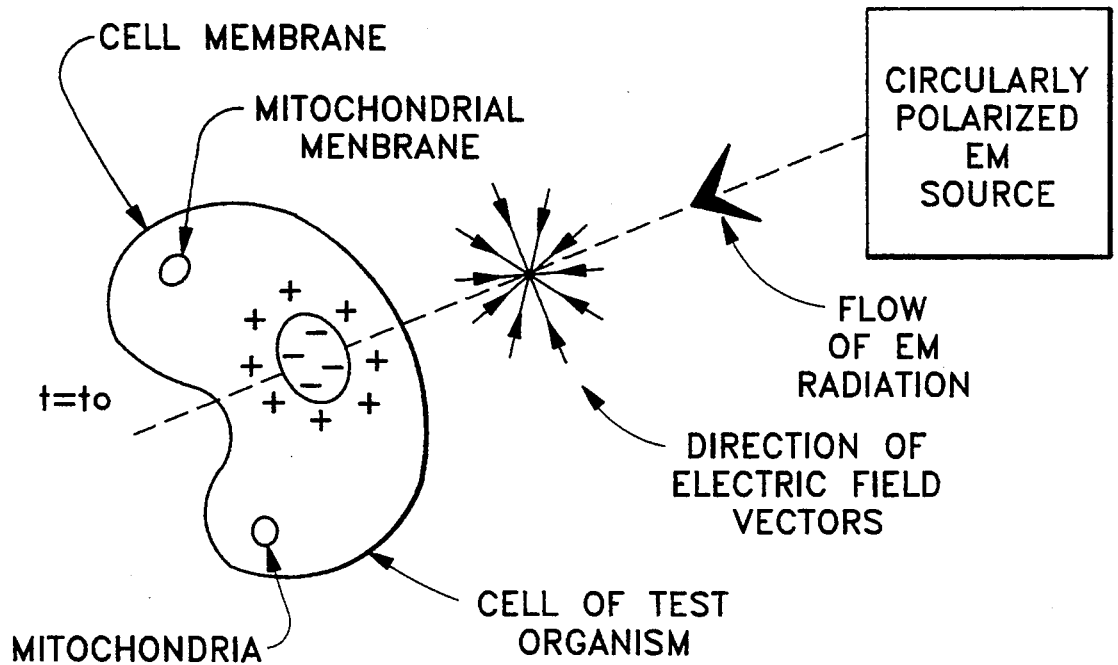
FIG. 1 shows a schematic representation of an application of an embodiment of the invention where the method of the invention is targeted at a mitochondria and the membrane of the mitochondria of a pest organism, incorporating the teachings of the present invention.
Figure 1:
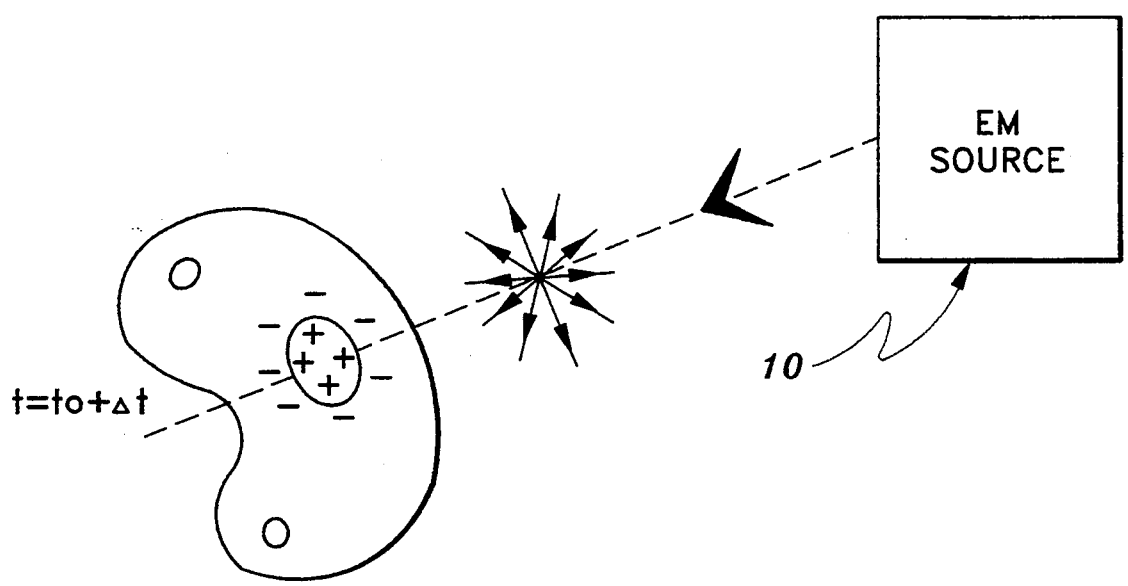

In FIG. 1, the method of the present invention for applying coherent EM radiation to a cell of an agricultural pest organism is shown, in this case, to a specific organelle, the mitochondria. The method of the present invention preferably comprises the steps of generating a narrow-band EM radiation for application on and coupling with cellular organelles, organelle membranes, or cell membranes of the pest organism. The pest organism may be any pest such as pathogenic fungi, bacteria, vascular plants, insects, virus, animal, or the like. A variety of frequencies, pulse widths and intensities of the EM radiation may be used, depending upon the specific application and pest organism to be controlled or destroyed. In FIG. 1, by way of example, mitochondria are represented as the target organelle for the EM radiation generated. The mitochondria are commonly known as the powerhouse of the cell, since they supply the free energy required by the cell metabolism. These mitochondria are small ellipsoids (approx. 200 nm) surrounded by a phospholipid bilayer called the mitochondrial membrane. Associated with its function of producing and secreting adensosine triphosphate (ATP), this mitochondrial layer suffers periodic reversals in polarity, which are connected with the permeability of the membrane. Because this membrane is a phospholipid dipole layer, it is very polarizable (on a scale on the order of nanoseconds), and so couples strongly to incoming coherent EM radiation. FIG. 1 shows the direction of the electric field vectors for a circularly polarized beam at a time $t=t'$, and then at a time $t'+Dt$. In this time period, the radially directed electric field vectors reverse polarity, inducing a reversal of polarity of the phospholipid bilayer which constitutes the mitochondrial membrane. Depending on the precise relationship between the natural period of tile reversals of polarity associated with the production and secretion of ATP, and that of the period of the incoming EM radiation, the ATP production by the mitochondria is either stimulated or suppressed. In either case, the normal dynamic electrochemical balance of the pest cell is disrupted. Furthermore, since the mitochondria of plant cells are so much different than animal cells, our method uses frequencies which are not close to the inverse of the natural time constant $Dt$ for the polarity oscillations of the mitochondria of tile plant cells so that they are not affected, but which will strongly couple to the mitochondria of the animal cells. To a lesser extent, this specificity of effect also occurs between different species of animal cells, since most species have cellular organelles whose structure is unique to that species, and so the method of the present invention couples specified EM radiation frequencies which uniquely disrupts cell organelles and cell membranes of that species. Coupling of the EM radiation to mitochondrial membranes of the pest organism is a preferred method of the present invention, however, other cellular organelles may be targeted, or organelle membranes, or cell membranes of the pest organisms using tile method of this invention. For example, the target of the EM radiation may be the ribosomes, Golgi bodies, endoplasmic reticulum, plasma membranes, centrioles, or other organelles or membranes within the pest organisms.

The method of tile present invention may be used with a wide variety of frequencies of EM radiation, including ELF, RF, microwave, and millimeter wave regions, for example. Two preferred ranges of frequencies and pulse widths in the RF and microwave regions which have been shown to strongly disrupt the ionic balance of tile target cells are described in detail herein as means of example. Also disclosed is a preferred embodiment of a system and apparatus which utilizes a broad-band antenna design optimized for a particular frequency range. Since EM radiation at a large range of frequencies (including the ELF, RF, microwave and millimeter wave regions) are potentially available which could coherently disrupt the biological functioning of the target organisms without excessive absorption by water molecules, the method and apparatus of the present invention encompasses the application of EM radiation to control or destroy the biological functioning of specific target organisms and is useful at many different frequencies and pulse widths in the electromagnetic spectrum.

The electro-biochemical basis of the preferred method of the invention utilized can be described using a model of active transport of ions across cell membranes and another model describing the coherent interaction of EM radiation acting directly on the organelles responsible for regulating the ionic balance within the target cells, preferably the mitochondria and the ribosomes (Ribosomes are the structure upon which RNA is transcribed into protein). Animal cells are extremely sensitive to the proper balance of Ca++ cations, K+ cations, and OH— anions in order to function properly, the reason being that any slight variation of this balance produces marked changes in biological properties such as cellular permeability, contractility, and protoplasmic viscosity. In fact, if an excessive amount of calcium (Ca++ cations) are released from the outer portion of the cytoplasm in animal cells, then this causes a clotting enzyme to be released which gels the cell. On the other hand, plant cells are not affected in this manner because of the nature of their cell walls. Plant cells also require a higher content of Mg++ cations than do animal cells. In one embodiment of the invention an apparatus is provided for initiating and sustaining said process for disrupting the balance of Ca++ or K+ cations in animal cells without overly affecting the Mg++ balance in plants. By initiating and sustaining an increase in cations within the pest organism. Such cation increase may be localized within cellular organelles such as the mitochondria, organelle membranes, or cell membranes within the pest organism. This selective and controllable application is possible because the mitochondria structures for plant cells are so much different than animal cells.

Plant and animal mitochondria differ in size and shape from one another. The natural polarization oscillations of the mitochondria membranes in plant and animal cells have a completely different spectrum, so that frequencies exist which will couple only to animal mitochondria thereby disrupting the ATP production required to regulate the animal cell's Ca++ or K+ balance, but not to plant mitochondria. Therefore the enzymatic cycles responsible for regulating the plant's $Mg++$ balance are unaffected, and the plant cells are not damaged. The method and apparatus of the present invention utilize such differences to provide a selective means for the control and destruction of pest organisms without affecting the ionic or electrochemical balance of valuable plant cells or cells of other beneficial organisms.

Transport mechanisms within the cell membrane allow the flow of material through by selective permeability to different ions. In this process various electrochemical phenomena take place which modify the transport and regulate the cell activity. In animal cells, the cell membrane is positively charged, and monovalent anions such as $OH—$ will readily enter the cell, whereas for monovalent cations such as $K+$ and divalent cations such as $Ca++$, the cell membrane will be less permeable depending on the isoelectric pH of proteins within the cytoplasm (osmotic gradient). But many enzymes require certain divalent cations for activation, so the isoelectric pH will change altering the charge on the cell membrane and thus readily allowing $Ca++$ ions to enter. Normally, this process is regulated by enzymatic reactions initiated and mediated by the mitochondria, however, the process of the present invention may also effect the ribosome structures inside the cell. That is, the mitochondria effect cause the activation of enzymes which cause $Ca++$ cations to enter the cytoplasm, however, the ribosome may also be effect by the pocess. Excess $Ca++$ react with $OH—$ anions, and thereby can be excreted out through the cell membrane. These periodic enzymatic reactions are sub-cycles of the tricarboxylic acid Krebs cycle, and can be modeled as non-equilibrium chemical oscillations, i.e. by the population dynamics given by the Lotka-Volterra model:

$$dN/dt = a\,NZS - b\,N \quad (1)$$

$$dS/dt = -a\,NZS + g\,S \quad (2)$$

where N, Z, S are the respective numbers of excited enzymes, non-excited enzymes, and substrates, and a, b, g, are rate parameters.

The EM radiation utilized in the preferred method of the invention is narrow-band EM radiation. A specific example of such narrow-band EM radiation is radiation of frequency 147 MHz at 8 watts/m2 which is directed on or coupled with the mitochondrial ATP-Synthase/ATPase channel (this effect also occurs at 240 MHz). This coupling effect influences ion gradients in a quite specific way, i.e. the $Ca++$ cation channel. In this way, an extreme state of mechanical agitation is induced on the membrane biochemically disrupting the mitochondria, thereby destroying the cell. However, numerous other frequencies may be effectively used using the method and apparatus of the present invention. For example, by generating and coupling a frequency 2.45 GHz at 60 mW/cm2 (as well as 9.14 GHz) on the activity of $Na+/K+$ ATPase within a cell, a resultant altering of $K+$ permeability results. This mechanical agitation is a coherent process which completely disrupts the mitochondria's ability to provide the free energy required to activate the regulatory enzymes and leads to destruction of the cell and consequently an entire organism. Exposure of cells to 16, 32, or 75 Hz sinosoidal electric fields reduces the release of $Ca++$. For example, the maxium reduction in $Ca++$ release occurs at 8 Hz (frequency dependent). Furthermore, dipole oscillations occur between $10^3$ Hz and $10^6$ Hz whereas the process of coherent excitation occurs at frequencies close to $10^{10}$ Hz.

The principal behind the abovementioned application of a preferred method of the present invention results from the disruption of a biochemical regulatory process within the cell which is best described as a periodic enzymatic reaction which requires a continual supply of ATP to occur. This ATP is manufactured and secreted by the mitochondria. Furthermore, the mitochondrial membranes are themselves semi-permeable, that is, mitochondria will take in water when placed in a hypotonic solution, and the inside membrane will be positively charged with respect to the outside. This creates an effective double layer of dipoles on the mitochondrial membrane. Now these swollen mitochondria can be contracted by the addition of ATP, extruding water.

Therefore, it is probable that the process of producing and secreting ATP by the mitochondria is associated with periodic volume changes and reversals of the polarization of the mitochondrial membrane, with a period on the order of several nanoseconds. Since the main function of the mitochondria is to produce and secrete ATP, the method and apparatus of the present invention applies selected EM radiation which interacts with this dipole double layer greatly influencing the permeability of the mitochondrial membrane, thereby suppressing or enhancing the secretion of ATP into the cytoplasm, and thereby disrupting various enzymatic regulatory reactions. In this manner the method and apparatus of the present invention may be used selectively, efficiently, and economically to control and destroy pest organisms without affecting ionic or electrochemical balances within the cells or organelles of valuable or beneficial organisms.

This disruption can be understood by noting that the Lotka-Volterra equations have periodic solutions, i.e. limit cycles which depend on the parameters a, b, g. As mentioned above, these limit cycles are sub-cycles of the overall Krebs cycle, and are crucial for the metabolism of the cell. For example, let x be the rate of ATP production. Then, according to the invention, the coupling a is a homogeneous function of the rate of ATP production. The rate parameter a for the enzymatic reaction is strongly dependent on the rate of the $PO_4$-phosphorylation (ATPase channel) associated with the mitochondria. Specifically:

$$a = a(x), g = \text{const. such that } a(0) = 0$$

According to the method of the present invention, the specific application of frequencies of EM radiation, such as those described and given by way of example, when coupled with the mitochondrial double layer will induce periodic reversals of polarity so that production and secretion of ATP by the mitochondria is either suppressed or over-stimulated. For example, if ATP production is suppressed, then $x \rightarrow 0$, so then $a \rightarrow 0$, and $g = $ constant, leading to the collapse of the limit cycle solution of equations, i.e., the periodic regulatory reaction terminates as $N \rightarrow 0$, $S \rightarrow $ const. Similarly, if the frequency of the EM radiation is such that ATP production is over-stimulated, i.e. $a >> 1$, then $S \rightarrow 0$, $N \rightarrow $ const., and again the limit cycle collapses, causing the disruption of this enzymatic reaction.

The application of the method of the present invention results in a collapse of this periodic enzymatic reaction completely disrupting the cell's ability to regulate the aforementioned $Ca++$ balance, leading to lysis, and break-up of the cell. That this happens through coherent interaction of EM radiation with specific organelles through a well-defined dipole reaction leads to a well-defined and repeatable, species-specific disruption of the cell's $Ca++$ or $K+$ balance at EM frequencies associated with the natural periods associated with the production and secretion of ATP by the mitochondria of a particular animal species. In this way EM radiation with a low water absorption coefficient is able to directly disrupt many of the enzymatic sub-cycles of the overall Krebs cycle which regulates the metabolism of the cell, leading to lysis, and resulting in its destruction.

Figure 2:
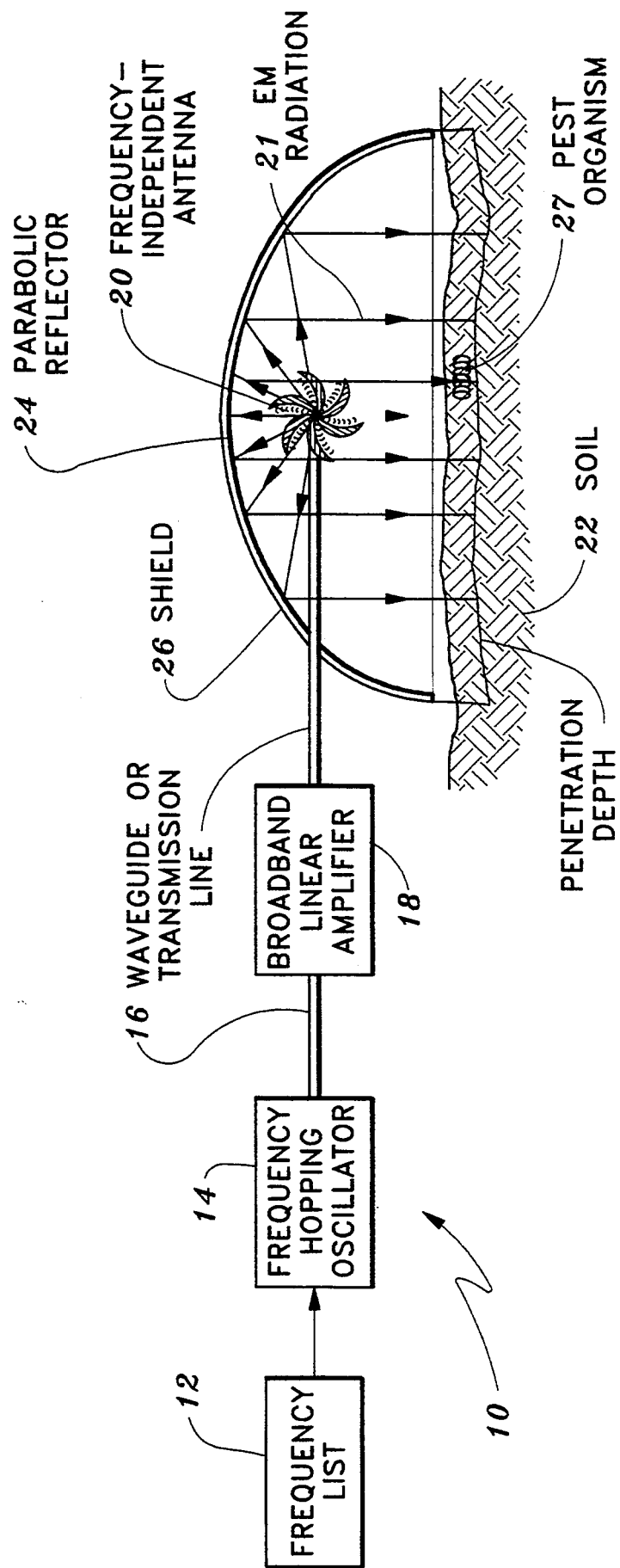
FIG. 2 shows a schematic representation of the components of an embodiment of the invention providing an apparatus for the application of the method of the invention, incorporating the teachings of the present invention.

Referring now to FIG. 2, a system and apparatus 10 are shown schematically for the specific control and destruction of agricultural pest organisms. In this embodiment, a system and apparatus are provided with means for generating a narrow-band EM radiation at a plurality of different frequencies, pulse widths, and intensities. The means for generating a narrow-band EM radiation preferably comprises a frequency-hopping RF oscillator 14 into which a frequency list 12 is preferably-programmed. However, alternatively, other spread-spectrum transmitting means or electronic counter-measures systems may be used, or standard oscillators if so desired. Frequency oscillator 14 is communicatively linked by transmission line 16 or wave guide to a broad band linear amplifier 18 coupled to a frequency-independent antenna 20 at the focus of a spherical or paraboloidal reflector 24. Oscillator 14 rapidly switches between the many specific frequencies found to couple strongly to the cellular structures of the pest organisms as previously described, such as 2-5 Ghz range other frequencies defined by the above equations, so that a large power density is spread over a broad band of bio-specific frequencies. Antenna 20, reflector 24, and shield 26 provide means to manipulate and focus the EM radiation onto pest organisms 27 in soil 22.

Of course, numerous other apparatus may be substituted for the specific apparatus described. The essential feature critical to the satisfactory application of the present invention is the ability for the oscillator or other EM radiation generator to rapidly switch between many specific frequencies found to couple to the cellular structures of the pest organism thereby operably utilizing the inventive concept of coherent biodisruption claimed herein. The linear amplifier 18 can then boost such signal without introducing appreciable distortion and spurious harmonics which could harm friendly species. Finally, the reflector 24 and antenna 20 allows for the focusing of EM radiation 21 directionally downward into soil 22, and also shields the operator from any harmful effects.

It is preferable that antenna 20 is a equi-angular spiral antenna allowing production of circularly polarized EM radiation which is optimal for coupling with the ellipsoidally shaped animal cell mitochondria. However, the method of the present invention may be applied using a wide variety of a single frequency, multiple frequency, or pulse-width modulation generators, depending upon the pest organism to be controlled and destroyed, and the environment in which the method will be used.

Additional advantages and modification will readily occur to those skilled in the art. The invention in its broader aspects is, therefore, not limited to the specific details, representative apparatus, and illustrative examples shown and described. Accordingly, departures may be made from such details without departing from the spirit or scope of the applicant's general inventive concept.

What is claimed is:

1. A method for the control and destruction of agricultural pest organisms, for specific coupling and destruction of specific cellular organelles, organelle membranes, or cell membranes within the pest organism, comprising:

generating a narrow-band EM radiation at a plurality of different frequencies, pulse widths, and intensifies for application on said pest organism;

coupling said narrow-band EM radiation to said cellular organelles, organelle membranes, or cell membranes of the pest organism;

disrupting an ionic balance within said cellular organelles, organelle membranes, or cell membranes by said narrow-band EM radiation;

initiating an increase in cation concentration within the cellular organelles, organelle membranes, or cell membranes; and sustaining said increase in cation concentration for a time sufficient to kill said pest organism.

2. The method of claim 1, wherein said narrow-band EM radiation couples strongly to said cellular organelles, organelle membranes, or cell membranes of said pest cell, but couples only weakly to organelles or membranes of valuable plant cells or cells of other beneficial organisms.

3. The method of claim 1, wherein said narrow-band EM radiation disrupts an ionic balance within said cellular organelles, organelle membranes, or cell membranes of said pest organism without affecting an electrochemical balance within valuable plant cells or cells of other beneficial organisms.

4. The method of claim 1, wherein said narrow-band EM radiation couples only weakly to water molecules.

5. The method of claim 1, wherein said narrow-band EM radiation does not cause detrimental heat generation within valuable plant cells or cells of other beneficial organisms.

6. The method of claim 1, wherein said narrow-band EM radiation is a continuous wave at a frequency of 147 Mhz and and intensity of 8W/M2.

7. The method of claim 6, wherein said narrow-band EM radiation is coupled to mitochondria within said pest organism thereby generating an increase concentration of $CA++$ ions therein, whereby the pest organism is destroyed.

8. The method of claim 1 wherein said narrow-band EM radiation is coupled to mitochondria within said pest cells thereby disrupting enzymatic sub cycles within said pest cells, resulting in an ionic imbalance within the pest cells, whereby the pest organism is destroyed.

9. The method of claim 1, wherein said narrow-band EM radiation is operably directed to disrupt adenosine triphosphate molecules and reactions of adenosine triphosphate molecules within said pest organism.

* * * * *